(12) United States Patent
Nakamura

(10) Patent No.: US 6,798,424 B2
(45) Date of Patent: Sep. 28, 2004

(54) IMAGE PROCESSING METHOD AND APPARATUS AND STORAGE MEDIUM

(75) Inventor: Yasufumi Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 463 days.

(21) Appl. No.: 09/769,373

(22) Filed: Jan. 26, 2001

(65) Prior Publication Data

US 2002/0003545 A1 Jan. 10, 2002

(30) Foreign Application Priority Data

Jul. 6, 2000 (JP) ........................................ 2000-205280

(51) Int. Cl.$^7$ ............................................. G06T 15/00
(52) U.S. Cl. ...................................................... 345/629
(58) Field of Search ................................ 345/629, 568, 345/636, 592; 382/162

(56) References Cited

U.S. PATENT DOCUMENTS

| | | | | |
|---|---|---|---|---|
| 5,493,638 A | * | 2/1996 | Hooper et al. | 345/636 |
| 5,630,037 A | * | 5/1997 | Schindler | 345/592 |
| 5,982,350 A | * | 11/1999 | Hekmatpour et al. | 345/629 |
| 6,134,346 A | * | 10/2000 | Berman et al. | 382/163 |
| 6,262,778 B1 | * | 7/2001 | Nonweiler et al. | 348/586 |
| 6,301,382 B1 | * | 10/2001 | Smith et al. | 382/162 |
| 6,532,022 B1 | * | 3/2003 | Ahmad | 345/629 |

FOREIGN PATENT DOCUMENTS

| | | |
|---|---|---|
| JP | 6-339136 | 12/1994 |
| JP | 8-305830 | 11/1996 |
| JP | 9-130803 | 5/1997 |
| JP | 10-63863 | 3/1998 |

* cited by examiner

Primary Examiner—Phu K. Nguyen
(74) Attorney, Agent, or Firm—Staas & Halsey LLP

(57) ABSTRACT

An image processing apparatus includes a frame specifying processor which specifies, from within a dynamic image, a frame having a background which is to be used, a background region specifying section which specifies a background region from an image of the specified frame, a background generator which generates an entire background from the specified background region and outputs a background data, and a non-background region setting section which creates a non-background region data in which a non-background region flag is set within a region where no background exists in the entire background which is generated. The background data and the non-background region data form a background object image.

14 Claims, 10 Drawing Sheets

IMAGE PROCESSING METHOD AND APPARATUS AND STORAGE MEDIUM

BACKGROUND OF THE INVENTION

This application claims the benefit of a Japanese Patent Application No. 2000-205280 filed Jul. 6, 2000, in the Japanese Patent Office, the disclosure of which is hereby incorporated by reference.

1. Field of the Invention

The present invention generally relates to image processing methods and apparatuses and storage media, and more particularly to an image processing apparatus and an image processing method which create a background image from a dynamic image and combine the background image with another image, and to a computer-readable storage medium which stores a program for causing a computer to combine a background image and another image in such a manner.

Recently, due to developments made in information processing techniques related to dynamic images, much attention is drawn to a technique which treats an object within a dynamic image and a background as independent object images. The ISO is working to standardize MPEG-4 as an international standard for dynamic image compression coding, and techniques related to object images, such as combining independent dynamic object images to generate one scene, are being studied for the MPEG-4.

While such studies are being made, various research have been made with respect to techniques for forming an object image by extracting only a specified object from within a dynamic image. In addition, with respect to a background of the image, various research have also been made to form a background object image by extracting only the background image from the image by removing the object within the image. A new dynamic image can be created by combining such a background object image and another dynamic object image.

2. Description of the Related Art

As methods of creating a background object image from a dynamic image in which the background is still (static background), there is a known method which obtains one background image by overlapping regions of each of the frames and having no object. According to this known method, the background regions of each of the frames can be specified and collected while viewing the dynamic image if the background is still, so as to obtain a background object image which is formed by a single static image.

In addition, a method for creating a background object image from a dynamic image in which the background moves (dynamic background) is proposed in a Japanese Laid-Open Patent Application No. 9-130803, for example. According to this proposed method, motion vectors of the background regions are used to estimate the background at portions where the background does not exist, so as to obtain a background image.

On the other hand, a Japanese Laid-Open Patent Application No. 6-338136 proposes a method for detecting motion of the background regions, so as to obtain a background image having no large distortions, even when the motion of the background differs for each of the background regions.

Furthermore, a Japanese Laid-Open Patent Application No. 8-305830 proposes a method for treating a background image as a portion of an original image when combining the background image and an object image, and combining the background image and the object image so that the object image conceals a background region where the background image does not exist. According to this proposed method, the original dynamic image is described by a structural data, and the background image and the object image are combined in a state where no hole exists in the background region, based on the structural data corresponding to the dynamic image and information related to the image which is to be obtained by combining the dynamic image and the background image.

However, the conventional image processing methods described above have the following problems.

According to the method for creating the background object image, it is a precondition that the entire background region is visible in order to be able to create the background object image. In other words, in a case where it is impossible to create a complete background such that the object image within the dynamic image constantly conceals a certain region of the background, it is only possible to obtain an incomplete background object image because the conditions for the background object image are not satisfied. With respect to such an incomplete background object image, the user must manually draw the background so as to fill in the hole portion where the background does not exist or, pixels at the hole portion must be estimated from neighboring pixels in the vicinity of the hole portion, so as to create a complete background object image in which no hole portion is visible. However, it requires a troublesome and time consuming operation to manually draw the background corresponding to the hole portion, thereby putting a considerably large load on the user. In addition, when the user manually draws the background corresponding to the hole portion, the originality of the image is lost because the manually drawn background is created artificially. On the other hand, it requires a complex and time consuming computing process to estimate the pixels at the hole portion, thereby putting a considerably large load on a processor within the image processing apparatus.

For example, it is possible to employ the method proposed in the Japanese Laid-Open Patent Application No. 8-305830 in order to fill the hole portion in the background. However, this proposed method regards the background as a portion of the original image, and it is impossible to separate only the background from the image. Accordingly, even in a case where only the background is required as a part, the entire original image including the background is obtained as one part, and the image processing efficiency becomes poor.

Therefore, according to the conventional image processing methods, there were problems in that it is impossible to generate a background object image from within a dynamic image and to carry out an image processing using the background object image as an independent image part, even with respect to a dynamic image which includes a region where the background is partially not visible.

SUMMARY OF THE INVENTION

Accordingly, it is a general object of the present invention to provide a novel and useful image processing method and apparatus and storage medium, in which the problems described above are eliminated.

Another and more specific object of the present invention is to provide an image processing method, an image processing apparatus and a computer-readable storage medium, which can generate a background object image from within a dynamic image and carry out an image processing using the background object image as an independent image part, even with respect to a dynamic image which includes a region where the background is partially not visible.

Still another object of the present invention is to provide an image processing apparatus comprising a frame specifying processor which specifies, from within a dynamic image, a frame having a background which is to be used, a background region specifying section which specifies a background region from an image of the specified frame, a background generator which generates an entire background from the specified background region and outputs a background data, and a non-background region setting section which creates a non-background region data in which a non-background region flag is set within a region where no background exists in the entire background which is generated, where the background data and the non-background region data form a background object image. According to the image processing apparatus of the present invention, it is possible to generate a background object image from within a dynamic image and carry out an image processing using the background object image as an independent image part, even with respect to a dynamic image which includes a region where the background is partially not visible.

A further object of the present invention is to provide an image processing apparatus comprising an image specifying processor which specifies frames having a background which is to be used, a background region specifying section which specifies a background region from images of the specified frames, a background generator which generates an entire background from the specified background region and outputs a background data, and a non-background region setting section which creates a non-background region data in which a non-background region flag is set within a region where no background exists in the entire background which is generated, where the background data and the non-background region data form a background object image. According to the image processing apparatus of the present invention, it is possible to generate a background object image from within a dynamic image and carry out an image processing using the background object image as an independent image part, even with respect to a dynamic image which includes a region where the background is partially not visible.

Another object of the present invention is to provide an image processing apparatus comprising a non-background region recognizing section which recognizes a non-background region within a background and obtains non-background region information, based on a non-background region data of a background object image, the non-background region data having a non-background region flag which is set within a region where no background exists in the background, an automatic combining position determination section which calculates a position of an object capable of concealing a hole in the background and determines position information, based on the non-background region information recognized by the non-background region recognizing section and position information within a dynamic image data of a dynamic image object image, and an image combining section which combines the background data of the background object image and the dynamic image data of the dynamic image object image into a single combined image, depending on the position information determined by the automatic combining position determination section. According to the image processing apparatus of the present invention, it is possible to automatically arrange an object so as to conceal a region where no background exists when combining a background object image and a dynamic image object image, thereby enabling a background having no hole to be generated in a simple manner.

Still another object of the present invention is to provide a computer-readable storage medium which stores a program for causing a computer to create a background object image, where the program causes the computer to perform the procedures of specifying, from within a dynamic image, a frame having a background which is to be used, specifying a background region from an image of the specified frame, generating an entire background from the specified background region and outputting a background data, and creating a non-background region data in which a non-background region flag is set within a region where no background exists in the entire background which is generated, where the background data and the non-background region data form the background object image. According to the computer-readable storage medium of the present invention, it is possible to generate a background object image from within a dynamic image and carry out an image processing using the background object image as an independent image part, even with respect to a dynamic image which includes a region where the background is partially not visible.

A further object of the present invention is to provide a computer-readable storage medium which stores a program for causing a computer to create a background object image, where the program causes the computer to perform the procedures of specifying frames having a background which is to be used, specifying a background region from images of the specified frames, generating an entire background from the specified background region and outputting a background data, and creating a non-background region data in which a non-background region flag is set within a region where no background exists in the entire background which is generated, where the background data and the non-background region data form the background object image. According to the computer-readable storage medium of the present invention, it is possible to generate a background object image from within a dynamic image and carry out an image processing using the background object image as an independent image part, even with respect to a dynamic image which includes a region where the background is partially not visible.

Another object of the present invention is to provide a computer-readable storage medium which stores a program for causing a computer to create a background object image, where the program causes the computer to perform the procedures of recognizing a non-background region within a background and obtaining non-background region information, based on a non-background region data of a background object image, where the non-background region data has a non-background region flag which is set within a region where no background exists in the background, calculating a position of an object capable of concealing a hole in the background and determining position information, based on the non-background region information recognized by the non-background region recognizing section and position information within a dynamic image data of a dynamic image object image, and combining the background data of the background object image and the dynamic image data of the dynamic image object image into a single combined image, depending on the position information determined by the automatic combining position determination section. According to the computer-readable storage medium of the present invention, it is possible to automatically arrange an object so as to conceal a region where no background exists when combining a background object image and a dynamic image object image, thereby enabling a background having no hole to be generated in a simple manner.

Still another object of the present invention is to provide an image processing method for creating a background object image, comprising the steps of specifying, from within a dynamic image, a frame having a background which is to be used; specifying a background region from an image of the specified frame; generating an entire background from the specified background region and outputting a background data; and creating a non-background region data in which a non-background region flag is set within a region where no background exists in the entire background which is generated, where the background data and the non-background region data form the background object image. According to the image processing method of the present invention, it is possible to generate a background object image from within a dynamic image and carry out an image processing using the background object image as an independent image part, even with respect to a dynamic image which includes a region where the background is partially not visible.

A further object of the present invention is to provide an image processing method for creating a background object image, comprising the steps of specifying frames having a background which is to be used; specifying a background region from images of the specified frames; generating an entire background from the specified background region and outputting a background data; and creating a non-background region data in which a non-background region flag is set within a region where no background exists in the entire background which is generated, where the background data and the non-background region data form the background object image. According to the image processing method of the present invention, it is possible to generate a background object image from within a dynamic image and carry out an image processing using the background object image as an independent image part, even with respect to a dynamic image which includes a region where the background is partially not visible.

Another object of the present invention is to provide an image processing method for creating a background object image, comprising the steps of recognizing a non-background region within a background and obtaining non-background region information, based on a non-background region data of a background object image, the non-background region data having a non-background region flag which is set within a region where no background exists in the background; calculating a position of an object capable of concealing a hole in the background and determining position information, based on the non-background region information recognized by the non-background region recognizing section and position information within a dynamic image data of a dynamic image object image; and combining the background data of the background object image and the dynamic image data of the dynamic image object image into a single combined image, depending on the position information determined by the automatic combining position determination section. According to the image processing method of the present invention, it is possible to automatically arrange an object so as to conceal a region where no background exists when combining a background object image and a dynamic image object image, thereby enabling a background having no hole to be generated in a simple manner.

Other objects and further features of the present invention will be apparent from the following detailed description when read in conjunction with the accompanying drawings.

DESCRIPTION OF THE PREFERRED EMBODIMENTS

Figure 1:
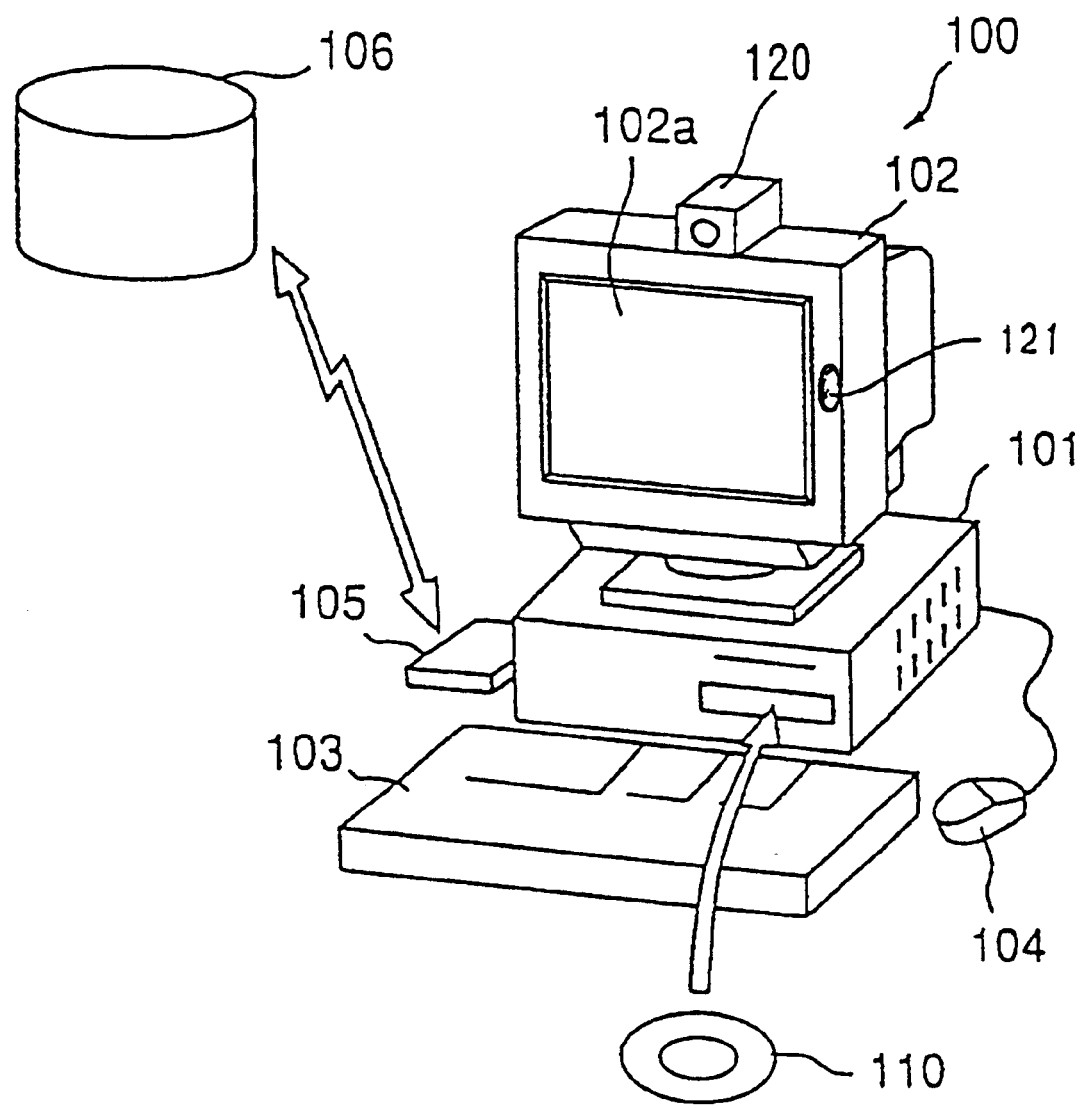
FIG. 1 is a perspective view showing a computer system applied with a first embodiment of the present invention.

In the present invention, if a region with no background exists when creating a background object image, a data in which a non-background region flag is set within a region where no background exists is simultaneously created. Hence, by reading the non-background region flag when combining the images, it is possible to simply recognize the region where no background exists. In addition, based on a region data such as a size of an object image and the data of the region having no background, the present invention automatically calculates a location where the object image should be arranged in order to conceal the hole in the background. Hence, it is possible to treat, as a part, the background image including the region where no background exists, similarly to treating a normal background image as a part.

On the other hand, in a case where the background image moves, it is possible to create the data in which the non-background region flag is set for each of frames, to be used as the background object image, similarly as described above. In this case, the background object image has a dynamic format, but the overlapping portions of the background images may be connected to form a single static image which describes the background. As a result, when the background is dynamic, the background object image may be used as a dynamic image or a single static image, thereby improving the utilization value of the background object image as a part.

A description will be given of various embodiments of an image processing method according to the present invention, an image processing apparatus according to the present invention and a computer-readable storage medium according to the present invention, by referring to the drawings.

First, a description will be given of a first embodiment of the image processing apparatus according to the present invention. This first embodiment of the image processing apparatus employs a first embodiment of an image processing method according to the present invention and a first embodiment of the computer-readable storage medium according to the present invention. In this first embodiment, the present invention is applied to a computer system. FIG. 1 is a perspective view showing the computer system applied with this first embodiment of the present invention.

A computer system 100 shown in FIG. 1 is generally provided with a main body 101 which includes a CPU, a disk drive and the like, a display 102 which has a display screen 102a for displaying an image in response to an instruction from the main body 101, a keyboard 103 which is used to input various kinds of information to the computer system 100, a mouse 104 which is used to specify an arbitrary position on the display screen 102a of the display 102, a modem 105 which is used to make access to an external database or the like and to download a program or the like stored in another computer system, an image pickup section 120 which includes a CCD camera or the like, and a speaker 121 which is used to reproduce sound.

A program (image processing software) for causing the computer system 100 to have an image processing function is stored in a portable recording medium such as the disk 110 or, downloaded from a recording medium 106 of another computer system using a communication unit such as the modem 105. The computer-readable storage medium according to the present invention is formed by a computer-readable recording medium such as the disk 110 which stores the program described above. The recording medium is not limited to a removable recording medium such as IC card memories, floppy disks, magneto-optical disks, CD-ROMs and various kinds of semiconductor memory devices, and also includes recording media accessible by a computer system which is connected via a communication means or a communication unit such as the modem 105 and a LAN.

Figure 2:
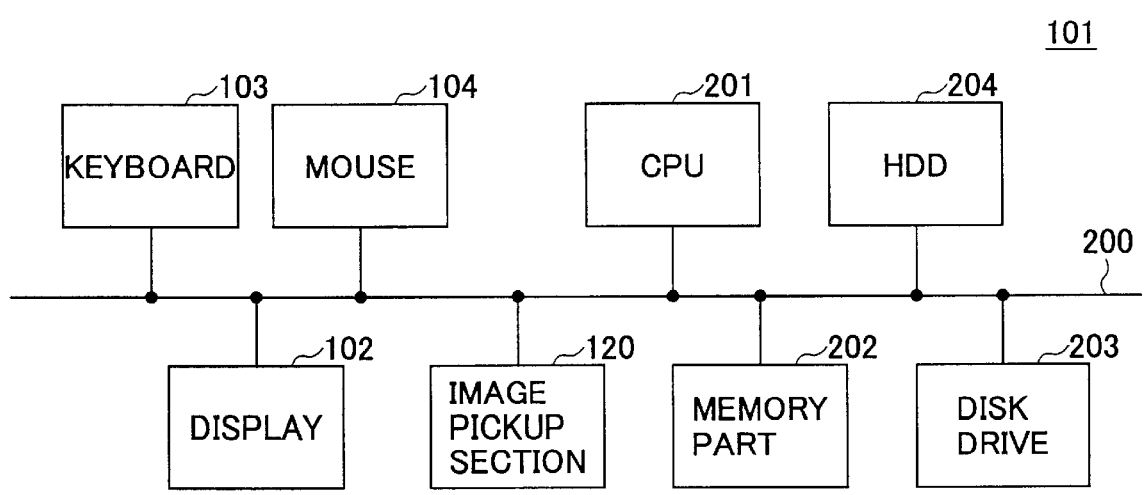
FIG. 2 is a system block diagram for explaining a construction of an important part within a main body of the computer system.

FIG. 2 is a system block diagram showing a construction of an important part within the main body 101 of the computer system 100. In FIG. 2, the main body 101 generally includes a CPU 201, a memory part 202 which is made of a RAM, ROM and the like, a disk drive 203 for the disk 110, and a hard disk drive (HDD) 204 which are connected via a bus 200. In this embodiment, the display 102, the keyboard 103, the mouse 104 and the image pickup section 120 are connected to the CPU 201 via the bus 200 as shown in FIG. 2, however, each of the display 102, the keyboard 103, the mouse 104 and the image pickup section 120 may be connected directly to the CPU 201. In addition, the display 102 and the image pickup section 120 may be connected to the CPU 201 via a known graphic interface (not shown) which processes input and output image data.

The construction of the computer system 100 is not limited to that shown in FIGS. 1 and 2, and it is of course possible to use various kinds of known constructions instead.

Figure 3:
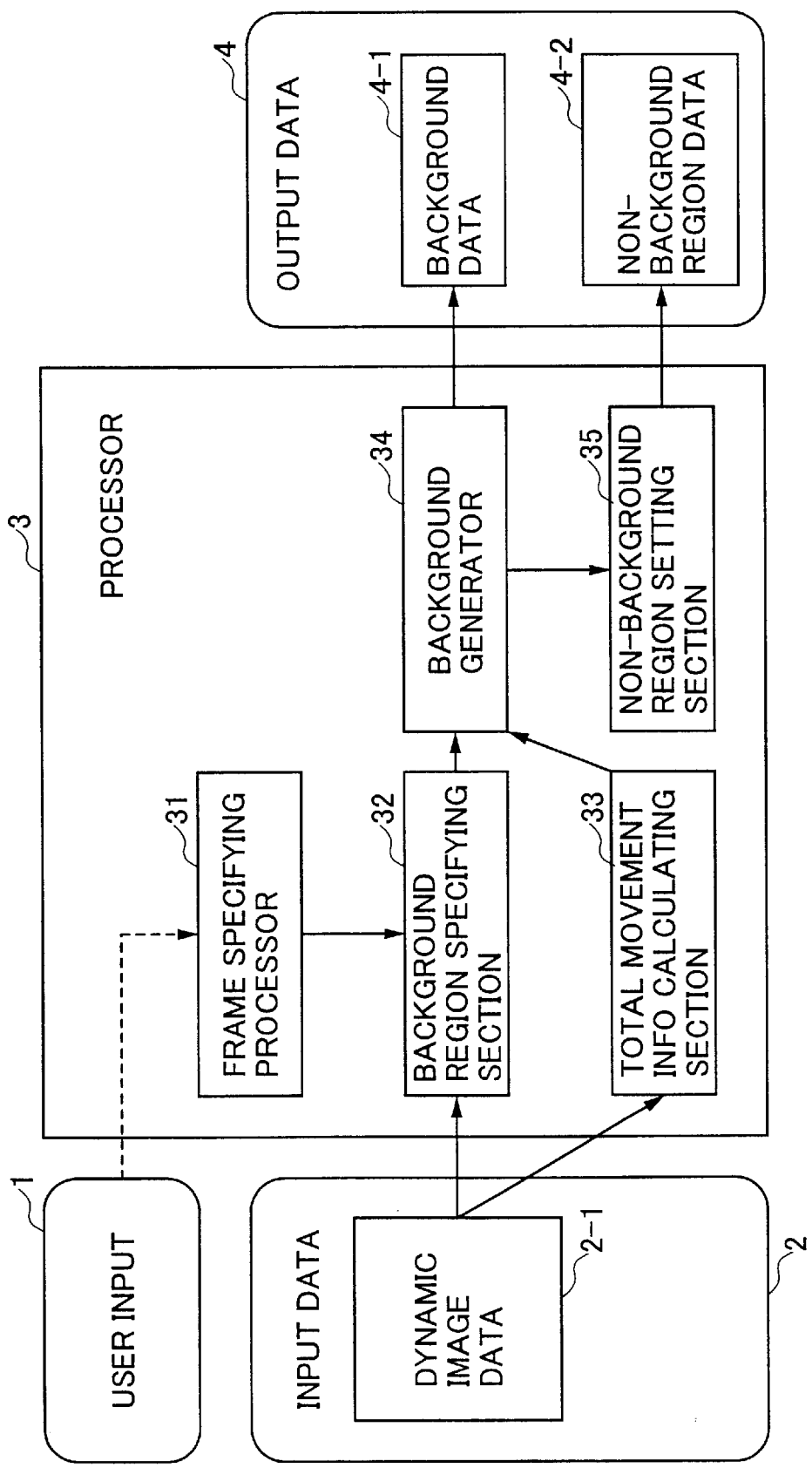
FIG. 3 is a diagram for explaining a process of a CPU in the first embodiment.

FIG. 3 is a diagram for explaining a process of the CPU 201 in this first embodiment. In FIG. 3, a processor 3 receives a user input 1 and an input data 2, and outputs an output data 4 by carrying out a background image creating process. The processor 3 is realized by the CPU 201. This processor 2 includes a frame specifying processor 31, a background image specifying section 32, a total movement information calculating section 33, a background generator 34, and a non-background region setting section 35. FIG. 3 shows the functional construction of the processor 3.

The user input 1 is input by the user from an input device such as the keyboard 103 and the mouse 104, and is supplied to the frame specifying processor 31. The input data 2 includes a dynamic image data 2-1 which is used to create a background. The input data 2 may be input from the memory part 202, the disk drive 203 or the HDD 204 or, input from another computer system via the modem 105. The input data is supplied to the background region specifying section 32 and the total movement calculating section 33. On the other hand, the output data 4 includes a background data 4-1 which is output from the background generator 34 and a non-background region data 4-2 which is output from the non-background region setting section 35. In this embodiment, it is assumed for the sake of convenience that the input data 2 and the output data 4 are supplied to the display 102 and displayed on the display screen 102a.

(1-1) Creating Background Image

In FIG. 3, the frame specifying processor 31 specifies a frame which includes an image which is selected as a background based on the user input 1 from the input device, from each of frame images within the dynamic image data 2-1 of the input data 2 displayed on the display screen 102a. The frame specifying processor 31 stores a frame number of the frame which is specified in this manner in the memory part 202, for example.

The background region specifying section 32 acquires, from the dynamic image data 2-1 of the input data 2, a frame image corresponding to the frame number which is specified by the frame specifying processor 31, and stores the acquired frame image in the memory part 202, for example. In addition, the background region specifying section 32 specifies a region which is to be set as the background based on the user input 1, of the stored frame image data, and stores the background region information in the memory part 202, for example. In this embodiment, it is assumed for the sake of convenience that the user directly specifies the background region by manipulating the input device while monitoring the displayed image data. However, it is of course possible to specify the background image automatically by use of a known image recognition technique.

The total movement information calculating section 33 calculates, from the dynamic image data 2-1 of the input data 2, a movement of the background region between each of the frames. The total movement information calculating section 33 stores the calculated movement information in the memory part 202, for example. The movement of the background region may be calculated by any one of various known methods. For example, it is possible to calculate the movement of the background region by dividing the image into blocks and finding out where each block moves to between the frames. Hence, it is possible to satisfactorily create the background image, even with respect to the dynamic image in which the background image moves or is deformed due to the camera which moves when picking up the dynamic image.

The background generator 34 generates the entire background based on the specified background region information from the background region specifying section 32 and the calculated movement information from the total movement information calculating section 33, and outputs the entire background as the background data 4-1. In addition, the background generator 34 may generate one static image (still image) by connecting overlapping portions of the background images.

When the background image generated by the background generator 34 includes a region where the background does not exist, the non-background region setting section 35 creates the non-background region data 4-2 in which a non-background region flag is set within the region where the background does not exist.

(1-2) Data Structure of Output Data

Figure 4:
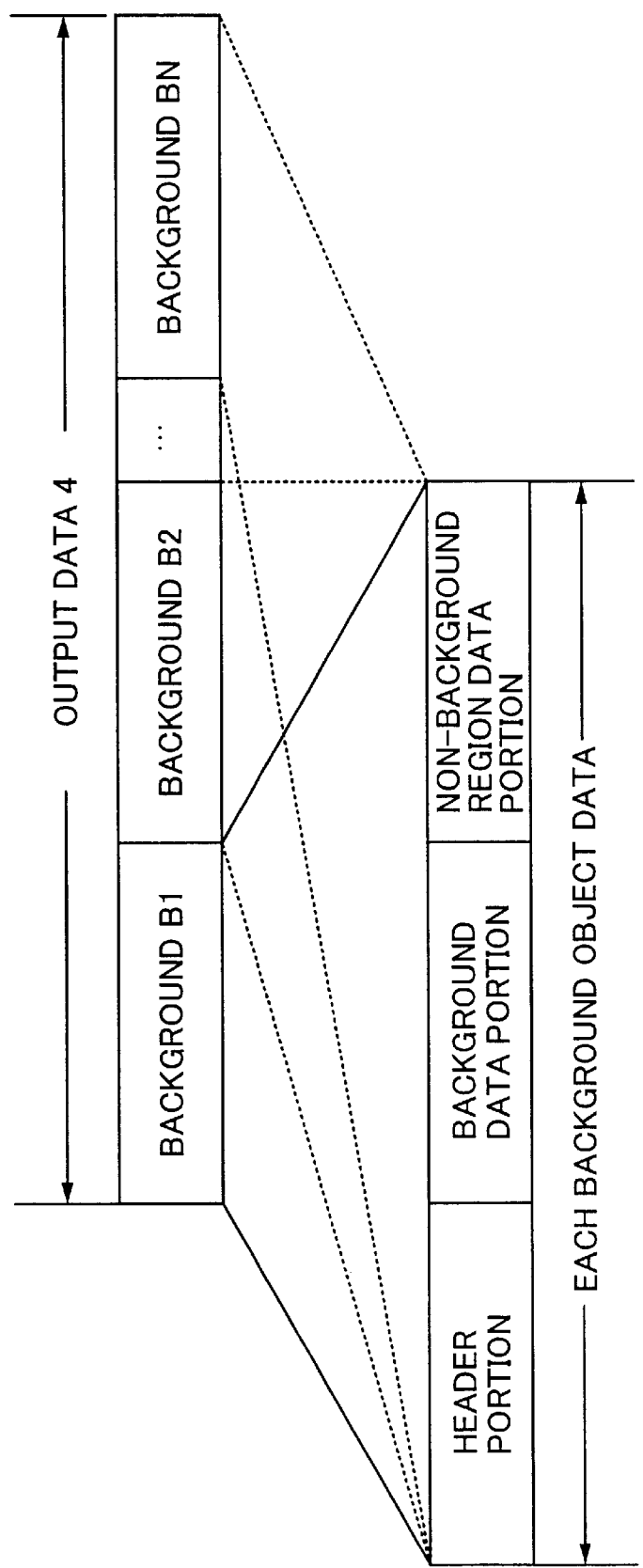
FIG. 4 is a diagram showing a data structure of a background data.

FIG. 4 is a diagram showing a data structure of the output data 4 which is output from the processor 3. As shown in FIG. 4, the output data 4 is made up of N backgrounds B1 through BN, where N is an integer greater than or equal to one. As shown in FIG. 4 for the background B1, each of the backgrounds B1 through BN is made up of a header portion, a background data portion where the actual background data 4-1 is stored, and a non-background region data portion where the non-background region data 4-2 is stored. Of course, the order of the data within each background data is not limited to that shown in FIG. 4.

The background data 4-1 may be raw data values for each of the pixels or, compressed data which has been compressed by an image compression format such as JPEG. The non-background region data 4-2 is a data row (or data sequence) indicating coordinate points corresponding to the non-background region, and a format of the non-background data 4-2 is not limited to a specific format. Accordingly, the non-background region data 4-2 may be data made up solely of coordinates of contour points of the non-background region, compressed data or, arbitrary data having an arbitrary format capable of specifying the non-background image region.

(1-3) Background Image Creating Process

Figure 5:
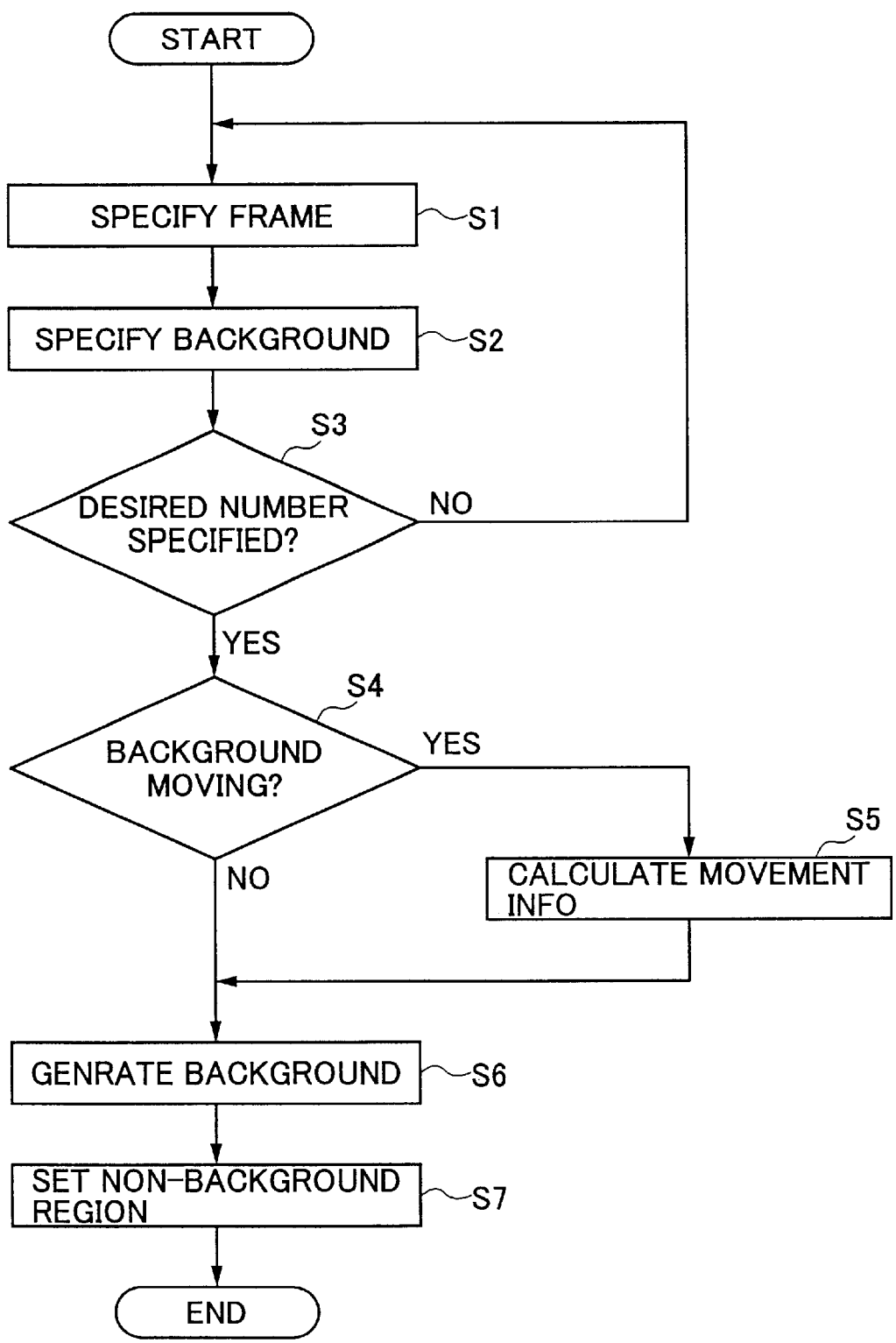
FIG. 5 is a flow chart for explaining a process of the CPU in the first embodiment.

FIG. 5 is a flow chart for explaining a process of the CPU 201 in this first embodiment. In FIG. 5, a step S1 corresponds to the process of the frame specifying processor 31, steps S2 and S3 correspond to the process of the background region specifying section 32, steps S4 and S5 correspond to the process of the total movement information calculating section 33, a step S6 corresponds to the process of the background generator 34, and a step S7 corresponds to the process of the non-background region setting section 35. The first embodiment of the computer-readable storage medium is formed by a recording medium which stores a program for causing the CPU 201 to carry out the process shown in FIG. 5.

In FIG. 5, when the background image creating process is started, the step S1 obtains a number of frames sufficient to create the background from each of the frame images within the dynamic image data 2-1 of the input data 2 which is displayed on the display screen 102a, and specifies the frame which includes the image which is to be selected as the background based on the user input 1 from the input device. In addition, the step S1 stores the frame number of the specified frame in the memory part 202, for example. It is of course possible to temporarily store the image data of the image which is picked up by the image pickup section 120 in the memory part 202 or the like, and use the image data which is read from the memory part 202 as the input data 2.

The step S2 acquires, from the dynamic image data 2-1 of the input data 2, the frame image data corresponding to the specified frame number, and stores the frame image in the memory part 202, for example. Moreover, the step S2 specifies the region which is to be set as the background, of the stored frame image data, based on the user input 1, and stores the background region information in the memory part 202, for example. The user may directly specify the background region by manipulating the input device while monitoring the displayed image data or, the background image may be specified automatically by use of a known image recognition technique. The step S3 decides, from the dynamic image data 2-1 of the input data 2, whether or not a desired number of frames sufficient to create the background has been specified, and the process returns to the step S1 if the decision result in the step S3 is NO.

On the other hand, if the decision result in the step S3 is YES, the step S4 decides, from the dynamic image data 2-1 of the input data 2, whether or not the background is moving. If the decision result in the step S4 is YES, the step S5 calculates the movement of the background region between each of the frames, and stores the calculated movement information in the memory part 202, for example. The movement of the background region can be calculated by any one of various known methods. For example, it is possible to divide the background image into blocks and find out where each block moves to between the frames.

If the decision result in the step S4 is NO or, after the step S5, the step S6 generates the entire background based on the specified background region information and the calculated movement information of the background region, and outputs the generated entire background as the background data 4-1. If the same coordinate points are included in a plurality of background regions when generating the background, one representative value is obtained for each coordinate point by obtaining an average value, a most frequent value, a maximum value, a minimum value or the like of the pixel value of the background at the coordinate point. In addition, the step S6 may generate one static image (still image) by connecting the overlapping portions of the background images.

When the generated background image includes a region where the background does not exist, the step S7 creates the non-background region data 4-2 in which the non-background region flag is set within the region where the background does not exist.

The background data 4-1 and the non-background data 4-2 which are output in the above described manner are stored in the memory part 202, for example, with a format employing the data structure described above in conjunction with FIG. 4.

Figure 6:
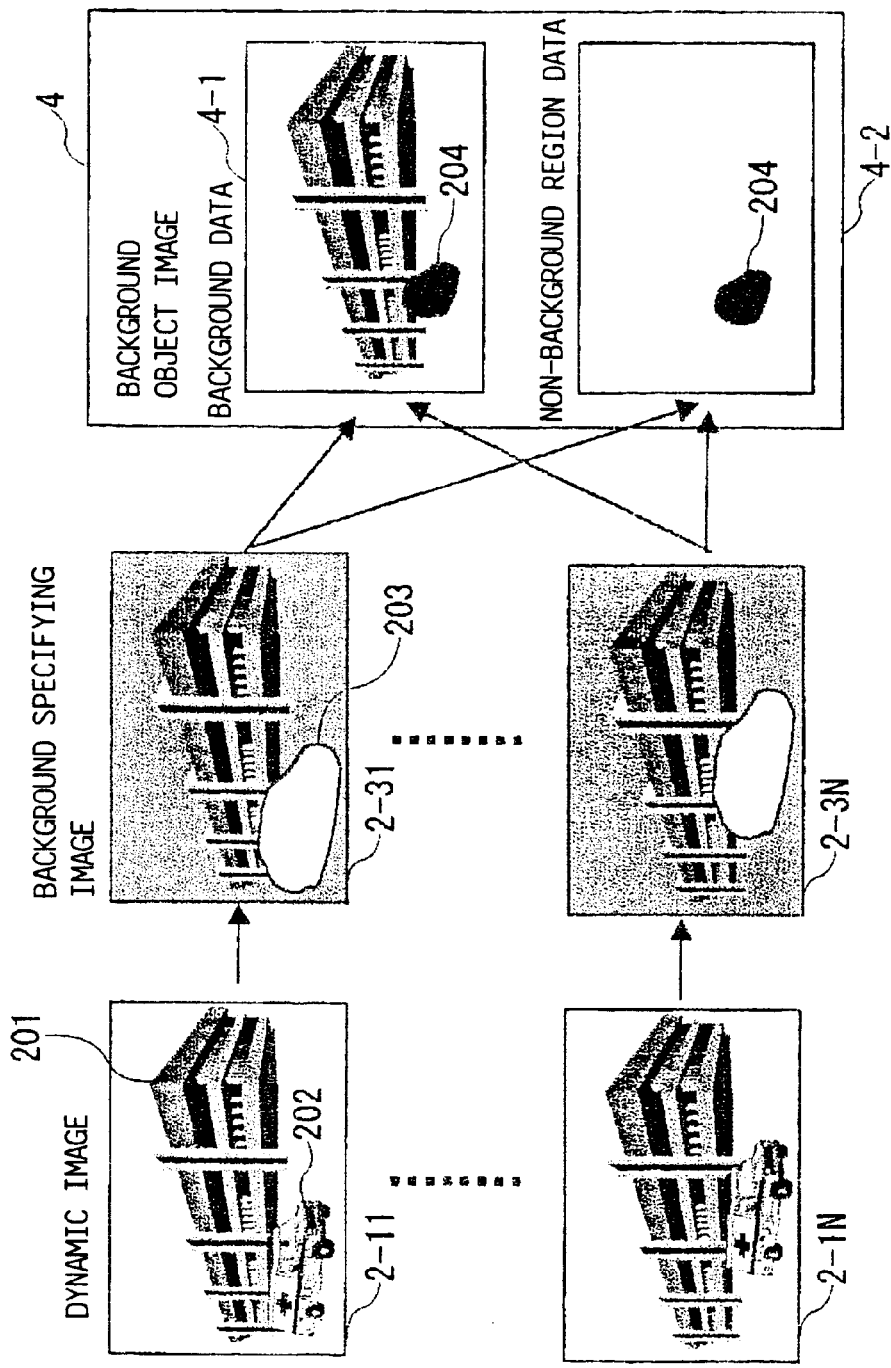
FIG. 6 is a diagram for explaining a background object image which is obtained by the first embodiment.

FIG. 6 is a diagram for explaining a background object image which is obtained in this first embodiment. In FIG. 6, it is assumed that a background consisting solely of a building 201 and excluding an ambulance 202 is to be created from the dynamic image data 2-1. A background object image 4 shown in FIG. 6 corresponds to the output data 4 shown in FIG. 3.

In this case, N frames 2-11 through 2-1N shown on the left part of FIG. 6, which are sufficient to create the background, are first obtained from the dynamic image data 2-1, so as to create N background specifying images 2-31 through 2-3N shown in the center part of FIG. 6. It is assumed that the shaded regions are set as thew background regions. Next, the backgrounds specified by each of the background specifying images 2-31 through 2-3N are successively stored in the memory part 202, for example, and one representative point is determined for overlapping points by obtaining the average value, the most frequent value, the maximum value, the minimum value or the like of the pixel value. In the case of this particular image, not all of the background is visible because of a hole 203 which exists, and the hole 203 remains in the background which is finally created. This hole 203 corresponds to a black region 204 within the background object image 4 which is shown on the right part of FIG. 6 and is formed by the background data 4-1 and the non-background region data 4-2. The pixel values within the region 204 (hole) are illustrated in FIG. 6 as indicating black, but if is of course possible to fill this region 204 (hole) by a different color or by a background region which is copied from another background.

Next, a description will be given of a second embodiment of the image processing apparatus according to the present invention. This second embodiment of the image processing apparatus employs a second embodiment of the image processing method according to the present invention and a second embodiment of the computer-readable storage medium according to the present invention. In this second embodiment, the present invention is applied to a computer system. The computer system applied with this second embodiment of the present invention may be the same as the computer system shown in FIGS. 1 and 2 applied with the first embodiment described above, and an illustration and description of the computer system will be omitted.

Figure 7:
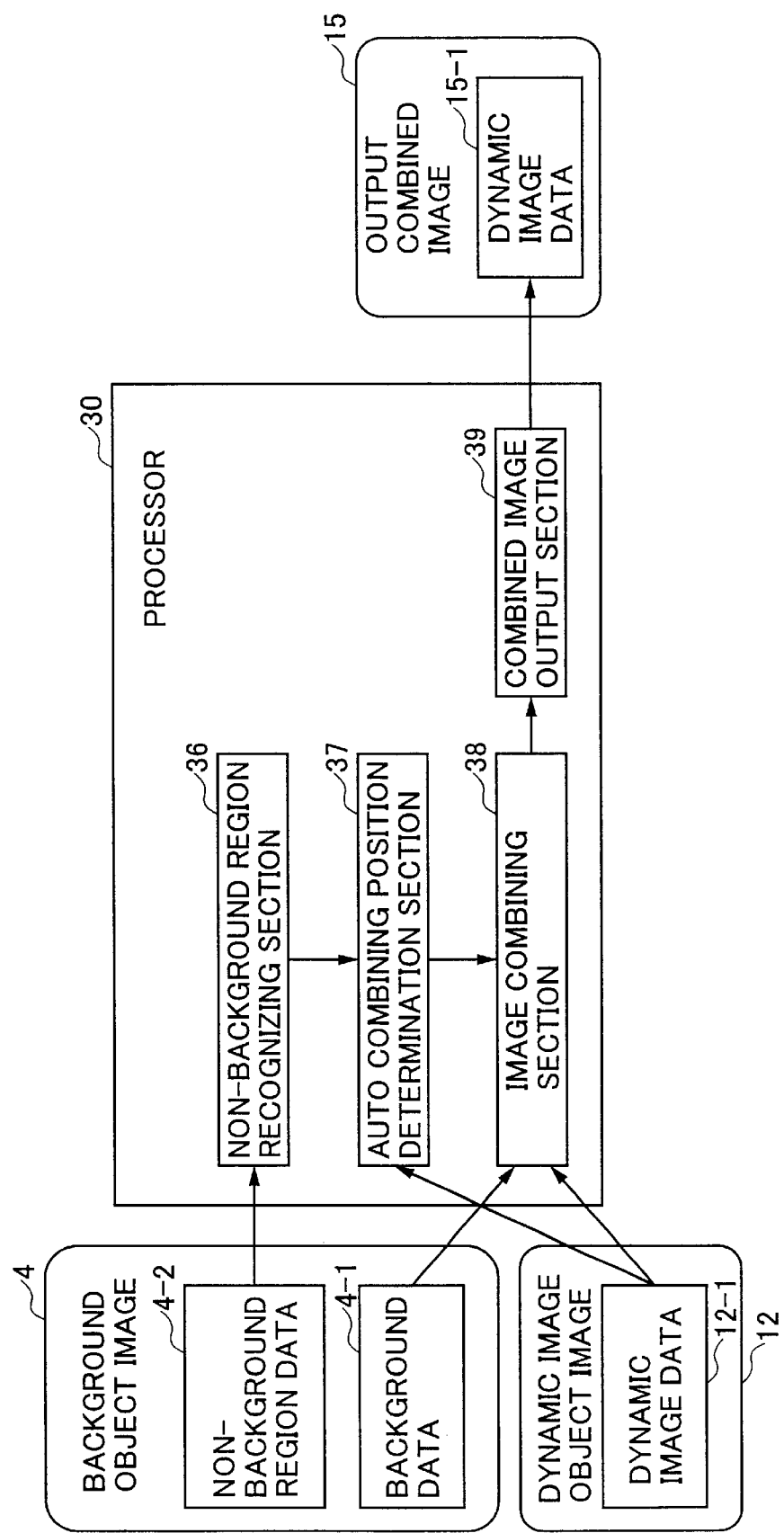
FIG. 7 is a diagram for explaining a process of the CPU in a second embodiment of the present invention.

FIG. 7 is a diagram for explaining a process of the CPU 201 in this second embodiment. In FIG. 7, a processor 30 receives the background object image 4 created by the first embodiment described above and a dynamic image object image 12, and outputs an output combined image 15 by carrying out an image combining process. The processor 30 is realized by the CPU 201. The processor 30 includes a non-background region recognizing section 36, a automatic combining position determination section 37, an image combining section 38, and a combined image output section 39. FIG. 7 shows the functional construction of the processor 30.

The background object image 4 is made up of the background data 4-1 related to the actual background image, and the non-background region data 4-2 indicating the region where the background does not exist. For example, the background object image 4 is read from the memory part 202 and input to the processor 30. The background data 4-1 is supplied to the image combining section 38. In addition, the non-background region data 4-2 is supplied to the non-background image recognizing section 36. The dynamic image object image 12 is made up of a dynamic image data 12-1 related to a dynamic image which is to be combined with the background image. For example, the dynamic image object image 12 is read from the memory part 202 and input to the processor 30. The dynamic image data 12-1 is supplied to the automatic combining position determination section 37 and the image combining section 38. The output combined image 15 is made up of a combined dynamic image data 15-1 which is a combined result. In this second embodiment, it is assumed for the sake of convenience that the background object image 4, the dynamic image object image 12 and the output combined image 15 are respectively supplied to the display 102 and displayed on the display screen 102a.

(2-1) Creating Combined Image

In FIG. 7, the non-background region recognizing section 36 recognizes the non-background region within the background, based on the non-background region data 4-2 of the background object image 4, and stores the recognized non-background region information in the memory part 202, for example.

The automatic combining position determination section 37 automatically calculates and determines a position of an object which can cover and conceal a hole in the background, based on the non-background region information recognized by the non-background region recognizing section 36 and position information within the dynamic image data 12-1 of the dynamic image object image 12, and stores the determined position information in the memory part 202, for example.

The image combining section 38 combines the background data 4-1 of the background object image 4 and the dynamic image data 12-1 of the dynamic image object image 12 into a single combined image, based on the position information determined by the automatic combining position determination section 37.

The combined image output section 39 outputs the combined image combined by the image combining section 38 as the single output combined image 15 made up of the combined dynamic image data 15-1, and displays the single output combined image 15 on the display screen 102a of the display 102.

(2-2) Image Combining Process

Figure 8:
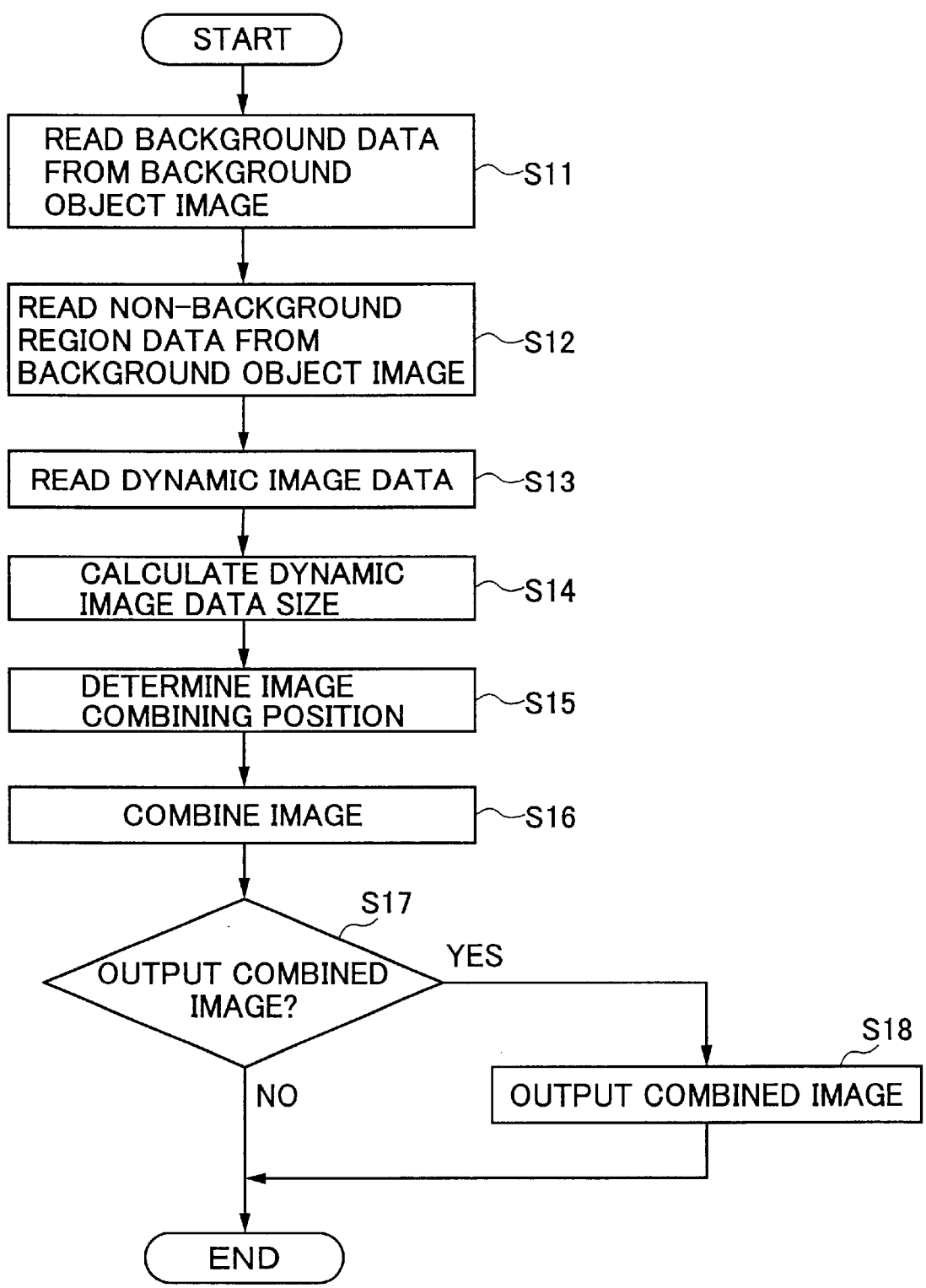
FIG. 8 is a flow chart for explaining a process of the CPU in the second embodiment.

FIG. 8 is a flow chart for explaining a process of the CPU 201 in this second embodiment. In FIG. 8, a step S11 corresponds to the process of the image combining section 38, a step S12 corresponds to the process of the non-background region recognizing section 36, a step S13 corresponds to the processes of the automatic combining position determination section 37 and the image combining section 38, steps S14 and S15 correspond to the process of the automatic combining position determination section 37, a step S16 corresponds to the process of the image combining section 38, and steps S17 and S18 correspond to the process of the combined image output section 39. The second embodiment of the computer-readable storage medium is formed by a recording medium which stores a program for causing the CPU 201 to carry out the process shown in FIG. 8.

In FIG. 8, when the image combining process is started, the step S11 reads the background data 4-1 from the background object image 4, and the step S12 reads the non-background region data 4-2 from the background object image 4. The step S13 reads the dynamic image data 12-1 from the dynamic image object image 12 which is to be combined with the background object image 4, and the step S14 calculates a data size of the dynamic image data 12-1. The background data 4-1, the non-background region data 4-2 and the dynamic image data 12-1 which are read, and the data size of the dynamic image data 12-1 which is calculated, are stored in the memory part 202, for example. It is possible to temporarily store the image which is picked up by the image pickup section 120 in the memory part 202 or the like, and to obtain the dynamic image object image 12 by reading the stored image from the memory part 202 or the like.

The step S15 calculates and determines a combining position where the background object image 4 and the dynamic image object image 12 are to be combined, based on the data size of the dynamic image data 12-1. The combining position is automatically determined so as to cover or fill the hole in the background. In a case where the background is made up of complete data and the background object image 4 includes no non-background image data 4-2, no hole will be visible regardless of the combining position, and the calculation of the combining position may be omitted.

Any one of various known methods may be employed to calculate the combining position. For example, the method of calculating the combining position may obtain circumscribing rectangles of each of the non-background region and the image region, and calculate the combining position such that the circumscribing rectangle of the image region always surrounds the circumscribing rectangle of the hole region. In addition, the method of calculating the combining position may obtain a moving region (dynamic region) of the dynamic image object image in advance, and align the end of this moving region to the end of the circumscribing rectangle of the hole region, so as to calculate the combining position depending on whether or not the hole region is no longer covered due to the movement of the dynamic image object image for each of the frames. Accordingly, the combining position may be calculated by methods which calculate the combining position based on the non-background region data and the data related to the position of the dynamic image object data.

In a case where the hole in the background is larger than the dynamic image object region and the hole cannot be covered by the dynamic image object region, it is possible to employ various techniques. For example, according to one technique, the size of the original dynamic image object image is maintained as it is, the combining position is obtained such that the hole in the background is covered as much as possible, and the portion of the hole which cannot be covered is left as it is. On the other hand, according to another technique, a deforming process such as enlarging is carried out with respect to the dynamic image object image, so as to completely cover the hole in the background.

Returning now to the description of the process shown in FIG. 8, the step S16 combines the background object image 4 and the dynamic image object image 12 at the combining position which is calculated in the step S15, so as to generate the output combined image 15. The step S17 decides whether or not to output the output combined image 15. If the decision result in the step S17 is YES, the step S18 outputs the output combined image 15 to the display 102 so as to display the output combined image 15 on the display screen 102a, and the process ends. On the other hand, if the decision result in the step S17 is NO, the output combined image 15 is stored in the memory part 202 or the like, for example, and the process ends. If a corresponding audio data exists with respect to the output combined image 15, a known method may be employed to reproduce the audio data from the speaker 121 at the same time the output combined image 15 is displayed on the display screen 102a of the display 102.

Figure 9:
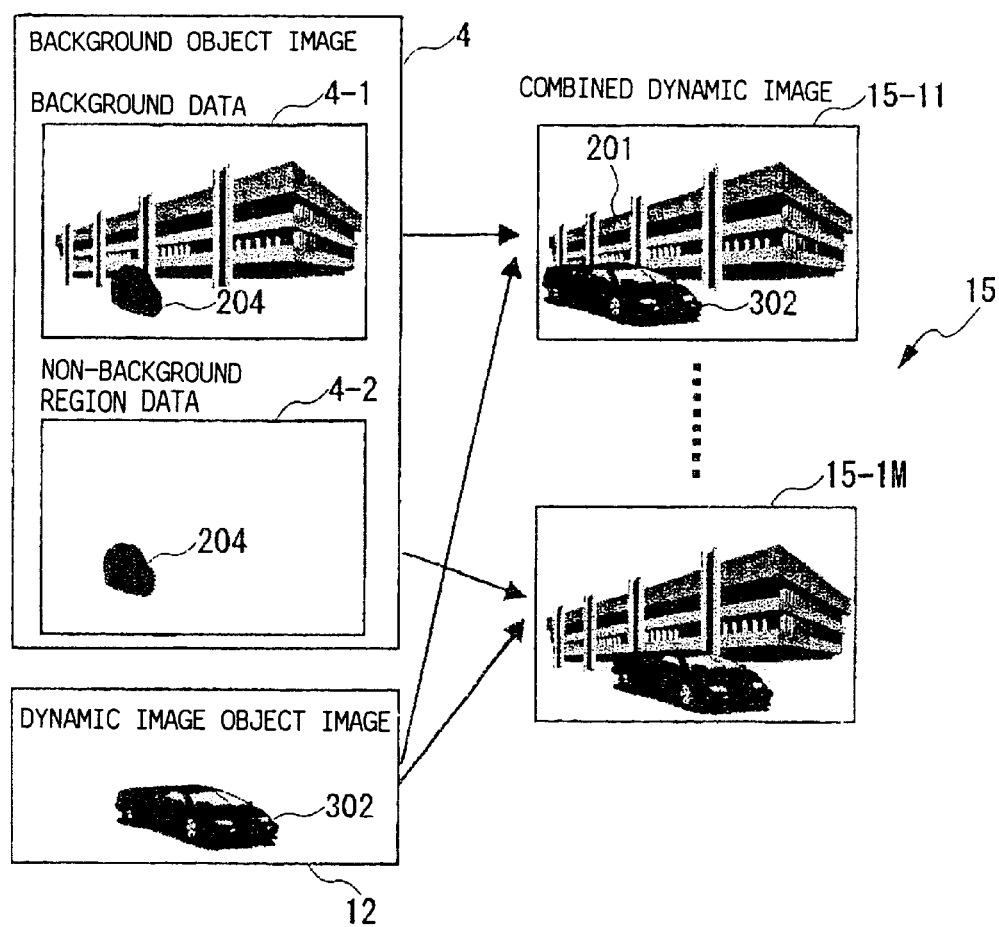
FIG. 9 is a diagram for explaining a combined dynamic image which is obtained by the second embodiment.

FIG. 9 is a diagram for explaining a combined dynamic image which is obtained by this second embodiment. In FIG. 9, those parts which are the same as those corresponding parts in FIG. 6 are designated by the same reference numerals, and a description thereof will be omitted. In FIG. 9, it is assumed that combined dynamic images 15-11 through 15-1M are generated from the background object image 4 and the dynamic image object image 12. In addition, it is assumed that the dynamic image object image 12 is related to a vehicle 302 different from the ambulance 202. The combined dynamic images 15-11 through 15-1M shown in FIG. 9 correspond to the output combined image 15 shown in FIG. 7.

As described above, this second embodiment recognizes the hole region 204 of the hole in the background from the non-background region data 4-1 of the background object image 4. Next, the size of the dynamic image object image 12 of the vehicle 302 which is to be overlapped on the background object image 4 is obtained, and the dynamic image object image 12 of the vehicle 302 is arranged at a position so as to conceal the hole region 204 of the hole in the background when combining the background object image 4 and the dynamic image object image 12.

Any one of various known methods may be employed to calculate the combining position where the dynamic image object image is to be arranged, similarly to the above described methods of calculating the combining position. For example, the method of calculating the combining position may obtain circumscribing rectangles of each of the hole region (non-background region) and the image region, and calculate the combining position such that the circumscribing rectangle of the image region always surrounds the circumscribing rectangle of the hole region. In addition, the method of calculating the combining position may obtain a moving region (dynamic region) of the dynamic image object image in advance, and align the end of this moving region to the end of the circumscribing rectangle of the hole region, so as to calculate the combining position depending on whether or not the hole region is no longer covered due to the movement of the dynamic image object image for each of the frames. Accordingly, the combining position may be calculated by methods which calculate the combining position based on the non-background region data and the data related to the position of the dynamic image object data.

In the case shown in FIG. 9, the size of the vehicle 302 of the dynamic image object image 12 is larger than the size of the non-background region data 4-2 of the background object image 4, that is, the size of the hole region 204, and it is therefore possible to conceal the hole region 204 by the vehicle 302. However, in a case where the hole region in the background is larger than the dynamic image object region and the hole region cannot be concealed, it is possible to employ various techniques. For example, according to one technique, the size of the original dynamic image object image is maintained as it is, the combining position is obtained such that the hole region in the background is concealed as much as possible, and the portion of the hole region which cannot be concealed is left as it is. On the other hand, according to another technique, a deforming process such as enlarging is carried out with respect to the dynamic image object image, so as to completely conceal the hole region in the background. Therefore, it is possible to make the hole region 204 in the background inconspicuous as much as possible in the combined dynamic image 15.

Figure 10:
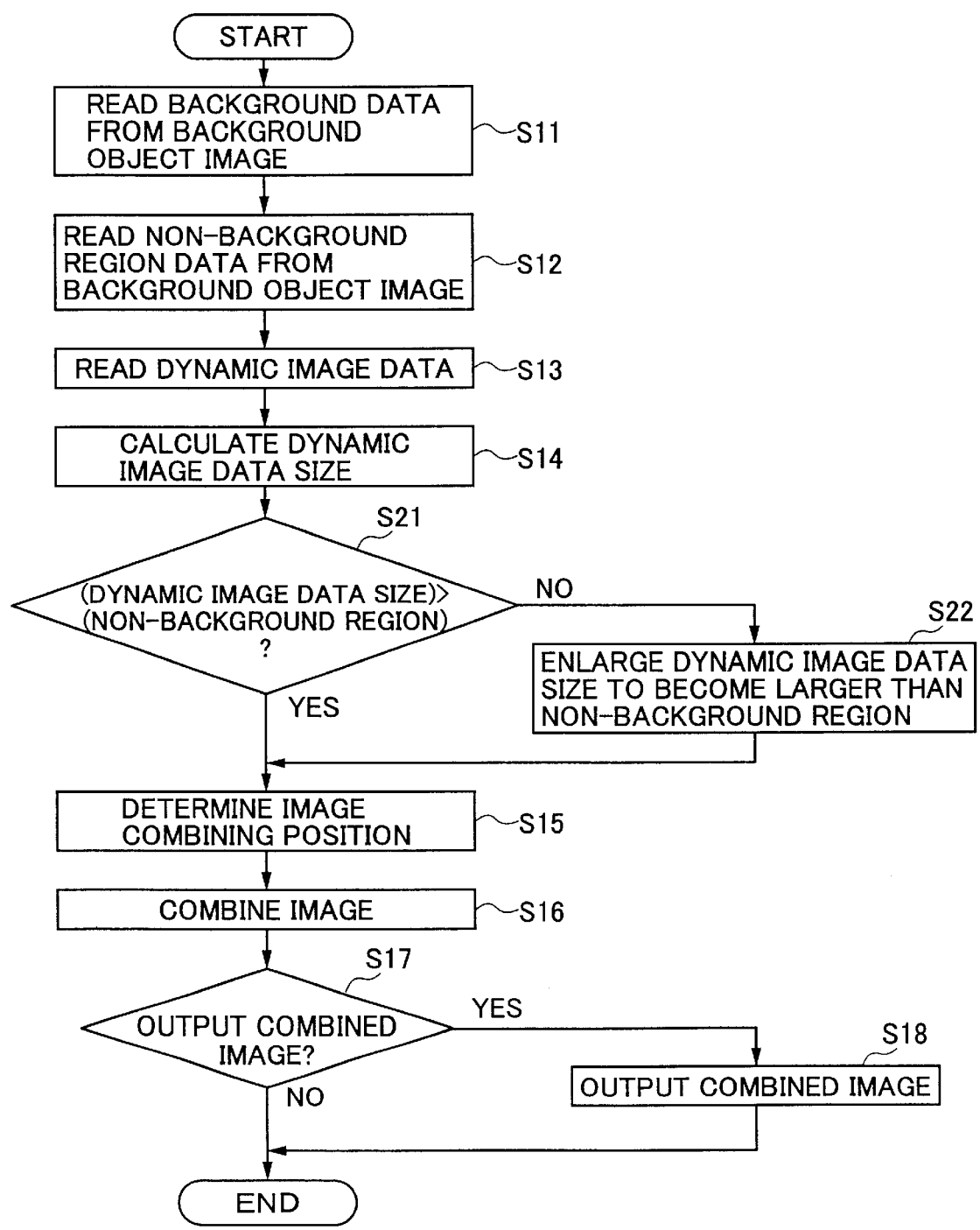
FIG. 10 is a flow chart for explaining a process of the CPU in a modification of the second embodiment of the present invention.

FIG. 10 is a flow chart for explaining a process of the CPU 201 in a modification of the second embodiment of the present invention. In FIG. 10, those steps which are the same as those corresponding steps in FIG. 8 are designated by the same reference numerals, and a description thereof will be omitted. In FIG. 10, steps S21 and S22 correspond to the process of the automatic combining position determination section 37. A modification of the second embodiment of the computer-readable storage medium is formed by a recording medium which stores a program for causing the CPU 201 to carry out the process shown in FIG. 10.

In FIG. 10, after the step S14, the step S21 decides whether or not the data size of the dynamic image data 12-1 is larger than the data size of the non-background region data 4-2. The process advances to the step S15 if the decision result in the step S21 is YES. On the other hand, if the decision result in the step S21 is NO, the images should not be combined in this state, and thus the step S22 is carried out. The step S22 enlarges the data size of the dynamic image data 12-1 to become larger than the data size of the non-background region data 4-2, and the process advances to the step S15. Otherwise, the process shown in FIG. 10 is the same as the process shown in FIG. 8.

Of course, it is possible to appropriately combine the first embodiment, the second embodiment and/or the modification of the second embodiment described above.

Further, the present invention is not limited to these embodiments, but various variations and modifications may be made without departing from the scope of the present invention.

What is claimed is:

1. An image processing apparatus comprising:
   a frame specifying processor specifying, from within a dynamic image, a frame having a background that is to be used;
   a background region specifying section specifying a background region from an image of the specified frame;
   a background generator specifying an entire background from the specified background region and outputting background data; and
   a non-background region setting section creating non-background region data in which a non-background region flag is set within a region where no background exists in the entire background that is generated,
   the background data and the non-background region data forming a background object image.

2. The image processing apparatus as claimed in claim 1, further comprising:
   a total movement information calculating section calculating a movement of the background region between each of a plurality of frames from the dynamic image to obtain movement information,
   the background generator generating the entire background and outputting the background data, based on background region information that specifies the background region and the movement information.

3. The image processing apparatus as claimed in claim 2, wherein the background generator generates a single static image by connecting overlapping portions of background images of each of the frames.

4. The image processing apparatus as claimed in claim 1, further comprising:
   a non-background region recognizing section recognizing a non-background region within the background and obtaining non-background region information, based on the non-background region data of the background object image;
   an automatic combining position determination section calculating a position of an object capable of concealing a hole in the background and determining position information, based on the non-background region information recognized by the non-background region recognizing section and position information within dynamic image data of a dynamic image object image; and
   an image combining section combining the background data of the background object image and the dynamic image data of the dynamic image object image into a single combined image, depending on the position information determined by the automatic combining position determination section.

5. An image processing apparatus comprising:
   an image specifying processor specifying frames having a background that is to be used;
   a background region specifying section specifying a background region from images of the specified frames;
   a background generator specifying an entire background from the specified background region and outputting background data; and
   a non-background region setting section creating non-background region data in which a non-background region flag is set within a region where no background exists in the entire background that is generated,
   the background data and the non-background region data forming a background object image.

6. An image processing apparatus comprising:
   a non-background region recognizing section recognizing a non-background region within a background and obtaining non-background region information, based on non-background region data of a background object image, the non-background region data having a non-background region flag that is set within a region where no background exists in the background;
   an automatic combining position determination section calculating a position of an object capable of concealing a hole in the background and determining position information, based on the non-background region information recognized by the non-background region recognizing section and position information within dynamic image data of a dynamic image object image; and
   an image combining section combining the background data of the background object image and the dynamic image data of the dynamic image object image into a single combined image, depending on the position information determined by the automatic combining position determination section.

7. A computer-readable storage controlling a computer and comprising a process of:
   specifying, from within a dynamic image, a frame having a background that is to be used;
   specifying a background region from an image of the specified frame;
   generating an entire background from the specified background region and outputting background data; and
   creating non-background region data in which a non-background region flag is set within a region where no background exists in the entire background that is generated,
   the background data and the non-background region data forming a background object image.

8. The computer-readable storage medium as claimed in claim 7, further comprising:
   calculating a movement of the background region between each of a plurality of frames from the dynamic image to obtain movement information; and
   generating the entire background and outputting the background data, based on background region information that specifies the background region and the movement information.

9. A computer-readable storage medium controlling a computer and comprising a process of:
   specifying frames having a background that is to be used;
   specifying a background region from images of the specified frames;
   generating an entire background from the specified background region and outputting background data; and
   creating non-background region data in which a non-background region flag is set within a region where no background exists in the entire background that is generated,
   the background data and the non-background region data forming a background object image.

10. A computer-readable storage medium controlling a computer and comprising a process of:
    recognizing a non-background region within a background and obtaining non-background region information, based on non-background region data of a background object image, the non-background region data having a non-background region flag which is set within a region where no background exists in the background;

calculating a position of an object capable of concealing a hole in the background and determining position information, based on the non-background region information recognized by said recognizing a non-background region and position information within dynamic image data of a dynamic image object image; and combining the background data of the background object image and the dynamic image data of the dynamic image object image into a single combined image, depending on the position information determined by said calculating a position of an object.

11. An image processing method for creating a background object image, comprising:

specifying, from within a dynamic image, a frame having a background that is to be used;

specifying a background region from an image of the specified frame;

generating an entire background from the specified background region and outputting a background data; and creating non-background region data in which a non-background region flag is set within a region where no background exists in the entire background which is generated, the background data and the non-background region data forming the background object image.

12. The image processing method as claimed in claim 11, further comprising:

calculating a movement of the background region between each of a plurality of frames from the dynamic image to obtain movement information, the entire background being generated and the background data being output, based on background region information that specifies the background region and the movement information.

13. An image processing method for creating a background object image, comprising:

specifying frames having a background that is to be used;

specifying a background region from images of the specified frames;

generating an entire background from the specified background region and outputting background data; and creating non-background region data in which a non-background region flag is set within a region where no background exists in the entire background that is generated, the background data and the non-background region data forming a background object image.

14. An image processing method for creating a background object image, comprising:

recognizing a non-background region within a background and obtaining non-background region information, based on non-background region data of a background object image, the non-background region data having a non-background region flag that is set within a region where no background exists in the background;

calculating a position of an object capable of concealing a hole in the background and determining position information, based on the non-background region information recognized by said recognizing a non-background region and position information within dynamic image data of a dynamic image object image; and combining the background data of the background object image and the dynamic image data of the dynamic image object image into a single combined image, depending on the position information determined by said calculating a position of an object.

* * * * *